Nov. 3, 1931.   F. DOERINCKEL ET AL   1,829,821
MANUFACTURE OF HOLLOW ARTICLES OF QUARTZ AND SIMILAR BODIES
OF HIGH MELTING POINT AND THE FURNACE THEREOF
Filed Sept. 9, 1927
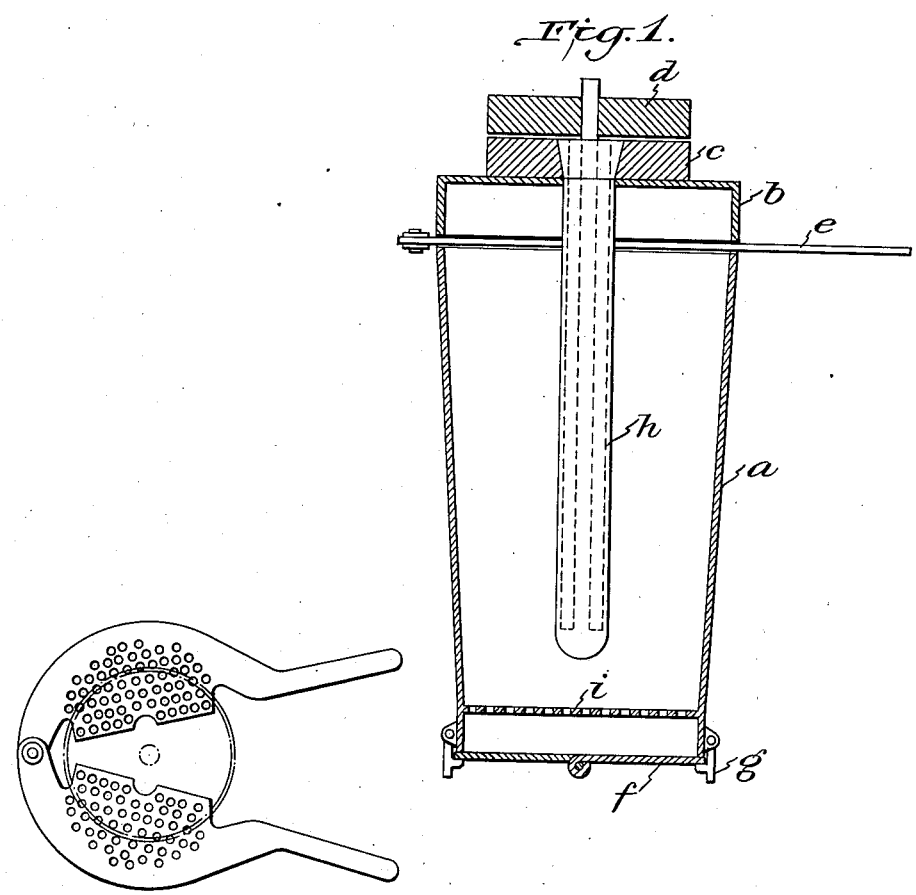

Patented Nov. 3, 1931

1,829,821

UNITED STATES PATENT OFFICE

FRITZ DOERINCKEL AND MARTIN SCHLIEMANN, OF LEVERKUSEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

MANUFACTURE OF HOLLOW ARTICLES OF QUARTZ AND SIMILAR BODIES OF HIGH MELTING POINT AND THE FURNACE THEREOF

Application filed September 9, 1927, Serial No. 218,556, and in Germany September 16, 1926.

The present invention concerns the manufacture of hollow articles of quartz and similar high melting materials open at one end and to suitable apparatus for carrying out said process.

The shaping of hollow articles of quartz and similar high melting materials open at one end is quite generally carried out except in the case where an oxygen blow pipe is used, in such a manner that the material to be melted is piled round a heating resistance, whereby a tubular melt is produced. The melt is then either open at both ends or open at one end as described in our specification Ser. No. 135,422 of September 14, 1926. In both cases the melt is removed from the furnace and transferred to the mould, in which it is then blown out in the known manner, until it touches the walls. Thus two considerable disadvantages inevitably arise from the transference from the furnace to the mould:—the transference is unavoidably accompanied by loss of heat, especially as regards the surface which is to be most extended by air blowing, and a further difficulty arises in the manufacture of heavy mouldings, that the dead weight distorts the pliable melt and may even cause it to tear with the result that the manufacture of such heavy mouldings is limited to narrow proportions.

According to the present invention these difficulties are obviated, the invention consisting essentially in uniting the functions of the mould and the furnace in a single apparatus thereby avoiding the transference of the plastic melt from the one to the other.

In order to carry out the process of our invention certain appliances are illustrated by way of example in Figures 1 and 2.

Figure 1 shows the process as applied to the formation of a tubular melt, open at one end according to our specification Ser. No. 135,422 of September 14, 1926.

In this:—

$a$ is the furnace and at the same time the moulding envelope, $b$ is the removable cover, $c$ and $d$ are the current leads, $e$ is a tong for squeezing the melt together, $f$ is a removable bottom, $g$ are the holders for the removable bottom, $h$ is the heating element, $i$ is a perforated bottom.

Fig. 2 shows a plan of one of the tongs.

The process is carried out in about the following manner when the contrivance illustrated in Figure 1 is made use of.

After the furnace has been charged in the customary manner and a melt of the desired consistency has been obtained, the leads $c$ and $d$, the heating element $h$, the cover $b$ and any sand supported by the latter are removed. Then a piece of high pressure tubing is introduced into the melt in the customary manner and the tongs $e$ is closed so that it will hold the melt, the removable bottom $f$ is then opened, whereby any unconsumed sand trickles through the perforations of the bottom $i$. When this is completely effected, the tongs $e$ is closed firmly and the melt is inflated until it touches the walls $a$ of the perforated bottom $i$ and the surface of the tongs $e$.

The contrivances for carrying out the process of our invention can be varied in many directions, in particular it is possible to mould variously shaped hollow articles with the same furnace, for which purpose the mould is appropriately subdivided, thus enabling the insertion of the requisite auxiliary pieces for the production of a melt of the desired shape.

Apart from the economy in heat and simplification of the process of working the principal advantage of our invention lies in the fact, that it permits the manufacture without difficulty of strong walled hollow articles of many hundred litres capacity, whereas in accordance with the old processes the manufacture of like articles of 30 to 40 litres capacity already required a particularly well trained staff.

We claim:—

Apparatus for the manufacture of hollow quartz bodies open at one end comprising a furnace the inner part of which has the shape of the article to be produced, said furnace having a perforated false bottom and a movable bottom, a movable cover, attached thereto an electric heating resistance reaching into the interior of said furnace which resistance is so shaped that the heating element can be withdrawn from the hollow article without damaging it, means at one end of said resistance for supplying the current thereto and tongs placed between the furnace and the cover thereof.

In testimony whereof we have hereunto set our hands.

FRITZ DOERINCKEL.
MARTIN SCHLIEMANN.